US008483156B2

(12) United States Patent  
Toskala et al.

(10) Patent No.: US 8,483,156 B2  
(45) Date of Patent: Jul. 9, 2013

(54) FEEDBACK FOR INTER-RADIO ACCESS TECHNOLOGY CARRIER AGGREGATION

(75) Inventors: Antti A. Toskala, Espoo (FI); Matti Jokimies, Salo (FI); Esa M. Malkamaki, Espoo (FI); Karri M. Ranta-Aho, Atlanta, GA (US); Juho Mikko Oskari Pirskanen, Tampere (FI); Jussi K. Ojala, Helsinki (FI); Timo E. Lunttila, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 189 days.

(21) Appl. No.: 12/774,132

(22) Filed: May 5, 2010

(65) Prior Publication Data

US 2011/0268048 A1    Nov. 3, 2011

Related U.S. Application Data

(60) Provisional application No. 61/330,542, filed on May 3, 2010.

(51) Int. Cl.
*H04W 4/00*    (2009.01)
*H04W 80/00*    (2009.01)

(52) U.S. Cl.
USPC ........................................ 370/329; 370/236.1

(58) Field of Classification Search
USPC .............. 370/328, 236, 236.1, 208, 335, 336, 370/343, 466, 467, 329
See application file for complete search history.

(56) References Cited

U.S. PATENT DOCUMENTS

2008/0040179 A1   2/2008  Masermann et al. .............  705/8
2008/0056193 A1*  3/2008  Bourlas et al. ................  370/331

(Continued)

FOREIGN PATENT DOCUMENTS

| EP | 1 798 898 A1 | 6/2007 |
| EP | 2 073 397 A1 | 6/2009 |
| WO | WO 2009/018164 A2 | 2/2009 |
| WO | WO-2009/093891 A1 | 7/2009 |

OTHER PUBLICATIONS

3GPP TS 36.300 V8.10.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Sep. 2009, 147 pages.

(Continued)

*Primary Examiner* — Brian D Nguyen
(74) *Attorney, Agent, or Firm* — Harrington & Smith

(57) ABSTRACT

A method includes simultaneously receiving a first communication using a first radio access technology and a second communication using a second radio access technology, and using only the first radio access technology, transmitting first feedback information for the first communication and second feedback information for the second communication to a network device that performed the first communication. A method includes, using a first radio access technology, receiving first feedback information for a first communication that used the first radio access technology and second feedback information for a second communication that used a second radio access technology. The method also includes, using the first feedback information in association with a subsequent communication using the first radio access technology, and communicating the second feedback information to a network entity that performed the second communication. Program products and apparatus are also disclosed.

21 Claims, 13 Drawing Sheets

U.S. PATENT DOCUMENTS

| | | | |
|---|---|---|---|
| 2010/0056150 A1 | 3/2010 | Mooney et al. | |
| 2010/0146135 A1* | 6/2010 | Evans et al. | 709/231 |
| 2010/0172428 A1* | 7/2010 | Pani et al. | 375/262 |
| 2010/0273515 A1* | 10/2010 | Fabien et al. | 455/509 |
| 2010/0279709 A1* | 11/2010 | Shahidi et al. | 455/456.2 |
| 2010/0325502 A1* | 12/2010 | Lindskog et al. | 714/748 |
| 2010/0331030 A1* | 12/2010 | Nory et al. | 455/509 |

OTHER PUBLICATIONS

3GPP TS 36.300 V9.1.0, "3rd Generation Partnership Project, Technical Specification Group Radio Access Network, Evolved Universal Terrestrial Radio Access (E-UTRAN), Overall description, Stage 2 ( Release 9)", Sep. 2009, 165 pages.

3GPP TR 36.814 V.1.5.0, "3rd Generation Partnership Project, Technical Specification Group Radio Access Network, Further Advancements for E-UTRA Physical Layer Aspects (Release 9)", Nov. 2009, 53 pages.

3GPP TR 36.913 V8.0.1 (Mar. 2009), "3rd Generation Partnership Project; Technical Specification Group Radio Access Network; Requirements for further advancements for Evolved Universal Terrestrial Radio Access (E-UTRA) (LTE-Advanced) (Release 8)", 15 pages.

3GPP TS 25.319 V9.3.0, "3rd Generation Partnership Project; Technical Specification Group Radio Access Network; Enhanced uplink; Overall description; Stage 2 (Release 9)", Mar. 2010, 72 pages.

3GPP TS 25.211 V9.1.0, "3rd Generation Partnership Project; Technical Specification Group Radio Access Network; Physical channels and mapping of transport channels onto physical channels (FDD) (Release 9)", Dec. 2009, 58 pages.

3GPP TS 36.212 V9.1.0, "Technical Specification 3rd Generation Partnership Project; Technical Specification Group Radio Access Network; Evolved Universal Terrestrial Radio Access (E-UTRA); Multiplexing and channel coding (Release 9)", Mar. 2010, 61 pages.

"Resource Allocation Considerations for Multi-Carrier LTE-Advanced Systems Operating in Backward Compatible Mode", Y. Wang, K. I. Pedersen, P.E. Mogensen, and T. B. Sorensen, in Proc. IEEE PIMRC, Sep. 2009, 5 pgs.

"Architecture Providing Multi-System Carrier Aggregation", U.S. Appl. No. 12/630,257, filed Dec. 3, 2009, 48 pgs.

* cited by examiner

FEEDBACK FOR INTER-RADIO ACCESS TECHNOLOGY CARRIER AGGREGATION

CROSS-REFERENCE TO RELATED APPLICATIONS

The present application claims the benefit under 35 U.S.C. §119(e) of U.S. Provisional Patent Application No. 61/330,542, filed on May 3, 2010, the disclosure of which is hereby incorporated by reference in its entirety.

TECHNICAL FIELD

This invention relates generally to radio frequency (RF) reception and transmission and, more specifically, relates to radio access technology carrier aggregation.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
- 3GPP third generation partnership project
- ACK acknowledge
- BTS base transceiver system
- BW bandwidth
- C-Plane control plane
- CN core network
- CQI channel quality indicator
- DC dual carrier
- DL downlink (eNB, Node B towards UE)
- DTX discontinuous transmission
- E-DCH enhanced downlink channel
- EDGE enhanced data rates for GSM evolution
- eNB EUTRAN Node B (evolved Node B)
- EPC evolved packet core
- EUTRAN evolved UTRAN (LTE)
- GGSN gateway general packet radio system support node
- GSM global system for mobile communication
- HARQ hybrid automatic repeat request
- HO handover
- HS-DSCH high speed downlink shared channel
- HS-SCCH high speed shared control channel
- HSPA high speed packet access
- HSDPA high speed downlink packet access
- HSUPA high speed uplink packet access
- I-HSPA internet HSPA (evolved HSPA)
- IP internet protocol
- L1 layer 1 (physical (Phy) layer)
- L2 layer 2 (MAC layer)
- LTE long term evolution
- MAC medium access control
- MM/MME mobility management/mobility management entity
- NACK not acknowledge/negative acknowledge
- NBAP Node B application part (signaling)
- Node B base station (includes BTS)
- OFDMA orthogonal frequency division multiple access
- O&M operations and maintenance
- PDCP packet data convergence protocol
- PDU protocol data unit
- Phy physical
- PMI pre-coding matrix index
- PRB physical resource block
- PDCCH physical downlink control channel
- PDSCH physical downlink shared channel
- PUCCH physical uplink control channel
- PUSCH physical uplink shared channel
- RACH random access channel
- RAT radio access technology
- RB radio bearer
- RE resource element
- RLC radio link control
- RNC radio network controller
- ROHC robust (internet) header compression
- RRC radio resource control
- SAW stop-and-wait
- SC-FDMA single carrier, frequency division multiple access
- SGSN serving gateway support node
- SGW serving gateway
- SINR signal to interference plus noise ratio
- SR scheduling request
- TCP transmission control protocol
- TFRC TCP-friendly rate control
- TTI transmit time interval
- U-Plane user plane
- UE user equipment
- UL uplink (UE towards eNB, Node B)
- UTRAN universal terrestrial radio access network
- WCDMA wideband code division multiple access The specification of a communication system known as evolved UTRAN (EUTRAN, also referred to as UTRAN-LTE or as EUTRA) has been specified by 3GPP in Rel-8 (release eight). As specified the DL access technique is OFDMA, and the UL access technique is SC-FDMA.

One specification of interest is 3GPP TS 36.300, V8.10.0 (2009-9), 3rd Generation Partnership Project; Technical Specification Group Radio Access Network; Evolved Universal Terrestrial Radio Access (EUTRA) and Evolved Universal Terrestrial Access Network (EUTRAN); Overall description; Stage 2 (Release 8). This system may be referred to for convenience as LTE Rel-8 (which also contains 3G HSPA and its improvements). In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.1.0 (2009-9).

FIG. 1A reproduces FIG. 4.1 of 3GPP TS 36.300, and shows the overall architecture of the E-UTRAN system. The E-UTRAN system includes eNBs, providing the EUTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many to many relationship between MMEs/Serving Gateways and eNBs.

The eNB hosts the following functions:
functions for Radio Resource Management: Radio Bearer Control, Radio Admission Control, Connection Mobility Control, Dynamic allocation of resources to UEs in both uplink and downlink (scheduling);

IP header compression and encryption of the user data stream;

selection of a MME at UE attachment;

routing of User Plane data towards Serving Gateway;

scheduling and transmission of paging messages (originated from the MME);

scheduling and transmission of broadcast information (originated from the MME or O&M); and measurement and measurement reporting configurations to provide mobility and scheduling.

Of particular interest herein are the further releases of 3GPP LTE targeted towards future IMT-A systems, referred to herein for convenience simply as LTE-Advanced (LTE-A).

Reference can be made to 3GPP TR 36.814, V1.3.1 (2009-06), 3rd Generation Partnership Project; Technical Specification Group Radio Access Network; Further Advancements for E-UTRA Physical Layer Aspects (Release 9). Reference can also be made to 3GPP TR 36.913, V8.0.1 (2009-03), 3rd Generation Partnership Project; Technical Specification Group Radio Access Network; Requirements for Further Advancements for E-UTRA (LTE-Advanced) (Release 8). A goal of LTE-A is to provide significantly enhanced services by means of higher data rates and lower latency with reduced cost.

GSM, WCDMA, and LTE in their first releases utilized single carrier transmission. Since then, multicarrier operation has been introduced in GERAN EGDE and WCDMA HSDPA (TS25.308 Rel-8-Rel-9) and HSUPA in (TS25.319 Rel9) operation. In HSPA multicarrier operation, the UE and Node B transmit on two parallel carriers in quite an independent manner and the multicarrier operation can be seen as multiple parallel single carrier transmissions performed on different carrier frequencies to/from the single UE. The multicarrier operation in HSDPA (dual cell or dual band) supports only single carrier uplink operation, but the Dual carrier HSUPA requires dual carrier downlink operation.

As is specified in 3GPP TR 36.913, LTE-A should operate in spectrum allocations of different sizes, including wider spectrum allocations than those of Rel-8 LTE, e.g., up to 100 MHz, to achieve the peak data rate of 100 mega-bits per second (Mbit/s) for high mobility and 1 Gbit/s for low mobility. LTE-A (to be included into 3GPP Release-10) is going to include carrier aggregation (CA), providing the capability to aggregate together up to five LTE carriers referred to as Component Carriers (CCs). The basic principle of CA in LTE for a single RAT is presented on FIG. 1B, which shows an example of the carrier aggregation, where M Rel-8 component carriers are combined together to form M×Rel-8 BW, e.g. 5×20 MHz=100 MHz given M=5.

Rel-8 terminals receive/transmit on one component carrier, whereas LTE-Advanced terminals may receive/transmit on multiple component carriers simultaneously (as shown in FIG. 1B) to achieve higher (e.g., wider) bandwidths. Basic scenarios for both downlink and uplink will be included into Release-10 (Rel-10). Similar work has also been carried out in the 3GPP in the context of HSDPA. In Release-10 the work on four-carrier HSDPA is currently ongoing, providing support for up to four, five mega-Hertz (MHz) carriers.

In LTE, the carrier aggregation, also called the multicarrier solution, is one of the main features to be defined for Rel-10 (TR36.814 and TR36.912) for LTE-A. In LTE also the basic principles are similar as the component carriers (single Rel-8 carrier) operate independently. Also in this specification, work will contain the operation with single carrier uplink with multiple downlink carriers.

The availability of the frequency spectrum on multiple bands is a challenge, as operators often have their bands occupied by, e.g., HSPA deployments and may be able to get new LTE spectrum only, e.g., for 2.6 GHz. Further, none of work so far has considered the carrier aggregation or multi-carrier operation between different radio technologies.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein:

FIG. 2, including FIG. 2A shows a logical split of roles of LTE and HSPA radios in inter-RAT carrier aggregation, wherein LTE UL is utilized to convey feedback information, such as HSPA UL control signaling (e.g., ACK/NACK or CQI or both); and FIG. 2B shows an example of carrier aggregation for RAT where both intra-band (carriers one and two) and inter-band (carrier three combined with carriers one and two) carrier aggregation;

FIG. 4, including

SUMMARY

In an exemplary embodiment, a method is disclosed that includes simultaneously receiving a first communication using a first radio access technology and a second communication using a second radio access technology, and using only the first radio access technology, transmitting first feedback information for the first communication and second feedback information for the second communication to a network device that performed the first communication.

In another exemplary embodiment, an apparatus is disclosed that includes one or more transceivers configured to transmit and receive using a first radio access technology and configured to transmit and receive using a second radio access technology; one or more processors; and one or more memories including computer program code. The at least one memory and the computer program code are configured to, with the one or more processors, cause the apparatus to perform at least the following: simultaneously receiving a first communication using the first radio access technology and a second communication using the second radio access technology; and using only the first radio access technology, transmitting first feedback information for the first communication and second feedback information for the second communication to a network device that performed the first communication.

In a further exemplary embodiment, a method is disclosed that includes, using a first radio access technology, receiving first feedback information for a first communication that used the first radio access technology and second feedback information for a second communication that used a second radio access technology. The method also includes using the first feedback information in association with a subsequent communication using the first radio access technology, and communicating the second feedback information to a network entity that performed the second communication.

DETAILED DESCRIPTION OF THE DRAWINGS

While current work in the 3GPP aims to aggregate only either LTE or HSPA carriers, it is natural to consider also allowing for a hybrid solution to enable inter-radio access technology (RAT) CA across multiple radio access technologies. In this context, considerations on whether some of the component carriers could be LTE (or LTE-A in general) carriers, while the other component carriers would be HSPA carriers, have been raised. This would be a rather attractive option, since the similarities in the physical layer of the two systems make it possible to largely reuse the same hardware.

Figure 2A:
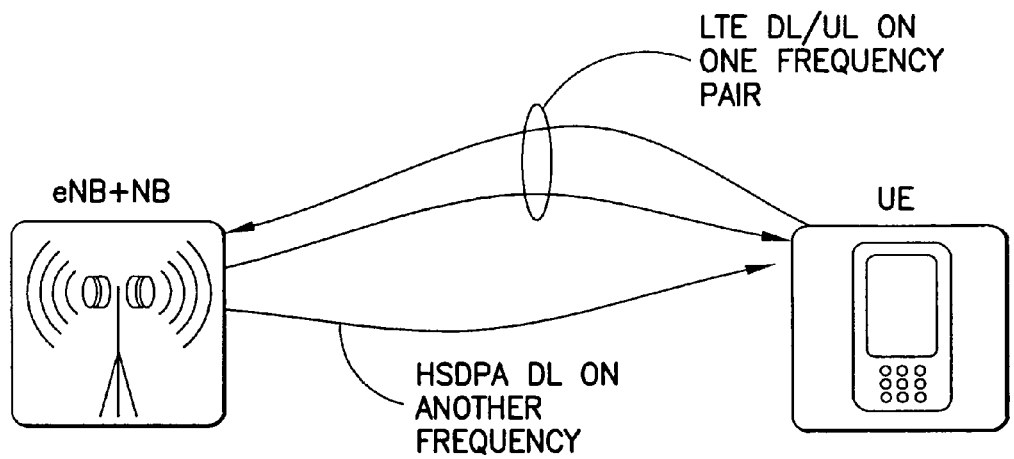
FIG. 2A and FIG. 2B, is a simplistic diagram of inter-RAT carrier aggregation, where.
Figure 2B:
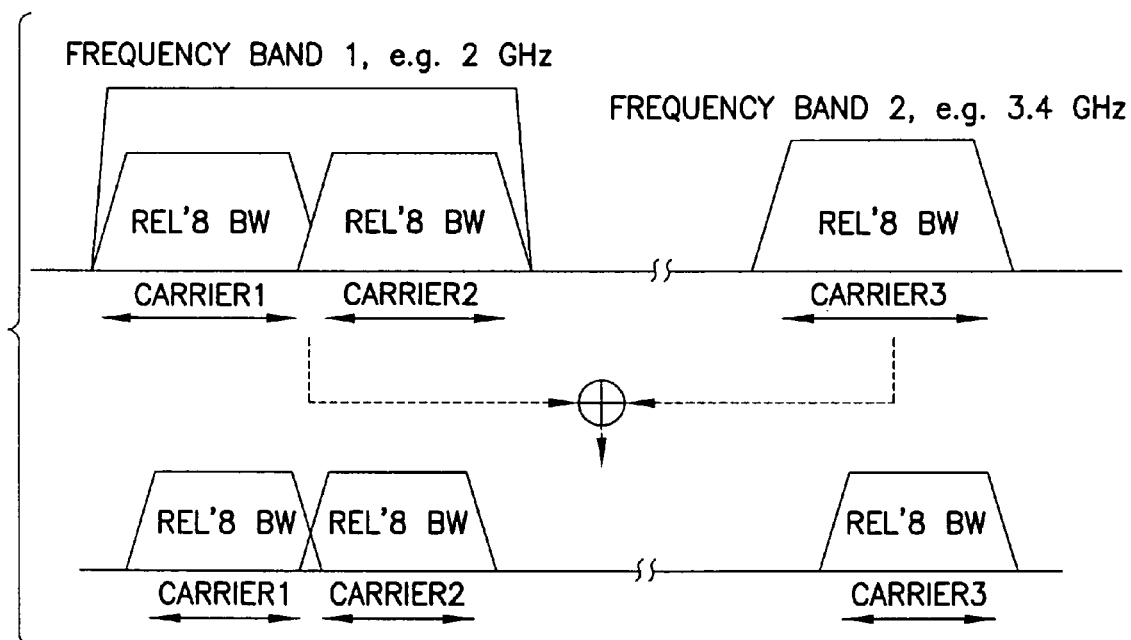

FIG. 2, including FIG. 2A and FIG. 2B, is a simplistic diagram of inter-RAT carrier aggregation. FIG. 2A shows a logical split of roles of LTE and HSPA radios in inter-RAT carrier aggregation, and FIG. 2B shows an example of carrier aggregation for RAT, where both intra-band (carriers one and two) and inter-band (carrier three combined with carriers one and two) carrier aggregation are shown. In these examples, the user equipment (UE) receives from co-located eNB (enhanced Node B) and NB (Node B) base stations two downlink communications at the same time, an LTE DL communication (from the eNB) and an HSDPA DL communication (from the NB), where the LTE DL communication includes frequency band two (2) (using OFDMA) and the HSDPA DL communication includes frequency band one (1) (using WCDMA). Inter-RAT carrier aggregation is, e.g., simultaneous communications that occur on at least two different carriers from two different RATs. It is noted that a radio access technology is, e.g., a unique air/radio interface defined by, for instance, a combination of resources (e.g., carriers having certain frequency ranges), resource spaces (e.g., subcarriers and symbols), and modulations. Although these figures show examples of how an inter-RAT communication might be performed, something to be considered is how feedback for both of LTE and HSDPA should be communicated by the UE back to the eNB.

A very attractive solution is to utilize LTE uplink (LTE UL in FIG. 2A) for the transmission of all UL control signaling for both LTE and HSDPA RATs. This resolves to a large extent the issues related to simultaneous transmission of multiple radios in the UE (such as RF emission issues, power consumption, etc.). Furthermore, it is safe to assume the need for, e.g., increased peak data rates in the UL and hence CA in general is significantly less motivated than in the DL side.

From the signaling point of view, the main challenges related to inter-RAT CA across LTE and HSPA are primarily related to the following aspects:

Allocation of the LTE radio resources for HSDPA control signals: The LTE eNodeB needs to know on which resources the HSDPA uplink control signals are transmitted. There needs to be a way to define this in all the cases, preferably without imposing non-single carrier transmission in the UL (N×PUCCH).

Timing of the HSDPA HARQ feedback: it needs to be ensured that there is a common understanding between the UE as well as the LTE eNodeB and the HSPA NodeB on when to expect the ACK/NACKs of DL data packets to be transmitted over the LTE UL (and once an ACK/NACK is received, to which packet in the HSDPA downlink the feedback corresponds).

Furthermore, it would be highly desirable to define the signaling for HSDPA uplink control signal in a way that does not mandate the HSDPA scheduler communicate the scheduling decision to the HSDPA scheduler in a dynamic manner, i.e., on a per TTI time scale. This would simplify the base station implementation considerably.

Combination of two radio accesses in uplink can be performed with (for instance) the following methods:

A) Multi-RAT transmission (in this case HSPA and LTE) are performed so that ULs are separate. This has the following disadvantages:

1) Combined UE TX power of the two RATs sets additional limits to power control mechanisms of both RATs, which leads to complexity in specifications and implementations;

2) Intermodulation results between different transmitted carriers in UE; and

3) Uplink scheduling complexity between different carriers in base stations of the two RATs.

B) Transmit control and all data of one RAT on one UL channel, and transmit only the control of the other RAT on its UL channel. In case of LTE-HSPA CA, this means that LTE UL is used for LTE control and all data, but HSPA UL only for HSPA side control (i.e., HS-DPCCH transmitted alone). This alleviates the problems 1), 2) and 3) above, but does not solve them.

C) Use only the uplink of one system, but include an UL control channel of the other system as such into the UL of the former system. In the case of HSPA-LTE CA, this would mean that the HSDPA UL control channel, HS-DPCCH, would be embedded into the LTE without modifications in LTE protocol, i.e., as user data. The problem with this approach is that it would be too slow for the HARQ process.

As traffic is many times asymmetric, and the possible solutions above potentially have significant problems, it would be beneficial also for LTE-HSPA carrier aggregation to have an operational mode where only DL carrier aggregation is performed and only single LTE or HSUPA uplink is utilized for multiple downlink carriers.

Thus, a current problem is to provide technical solutions where a single uplink can be utilized for LTE-HSDPA DL inter-RAT carrier aggregation. Aspects of the invention solve these problems.

In an exemplary embodiment, to support a carrier aggregation mode where there are at least two downlink carriers (at least one HSDPA carrier and one LTE carrier) and one uplink carrier needs to be arranged in uplink:

1) All uplink data PDU transmission is performed in single carrier. This can be implemented in an exemplary embodiment based on architecture given in U.S. patent Ser. No. 12/630,257, "Architecture Providing Multi-System Carrier Aggregation", by inventor Juho M. O. Pirskanen, filed on 3 Dec. 2009.

2) HARQ-info and CQI-info from the other carrier (that is, in the other RAT) is transmitted on an existing carrier, including correct timing.

The U.S. patent Ser. No. 12/630,257 application introduces suitable basic architecture. This architecture is considered here as baseline.

Thus, the following description provides, e.g., arrangements providing how an LTE uplink can transmit HARQ-info and CQI-info of the HSDPA transmission in a DL carrier aggregation solution between LTE and HSDPA, so that a single uplink can be utilized. The description also provides solutions where the delay requirements of the DL channels are met by delivering the HARQ information and CQI information, while the existing functionality of LTE protocol is preserved. Additionally, the impacts on the HSPA side below MAC-ehs are avoided by modifying the HS-DPCCH information (HARQ ACK/NACK and CQI) before it is delivered to HSPA side in an exemplary embodiment.

Figure 3:
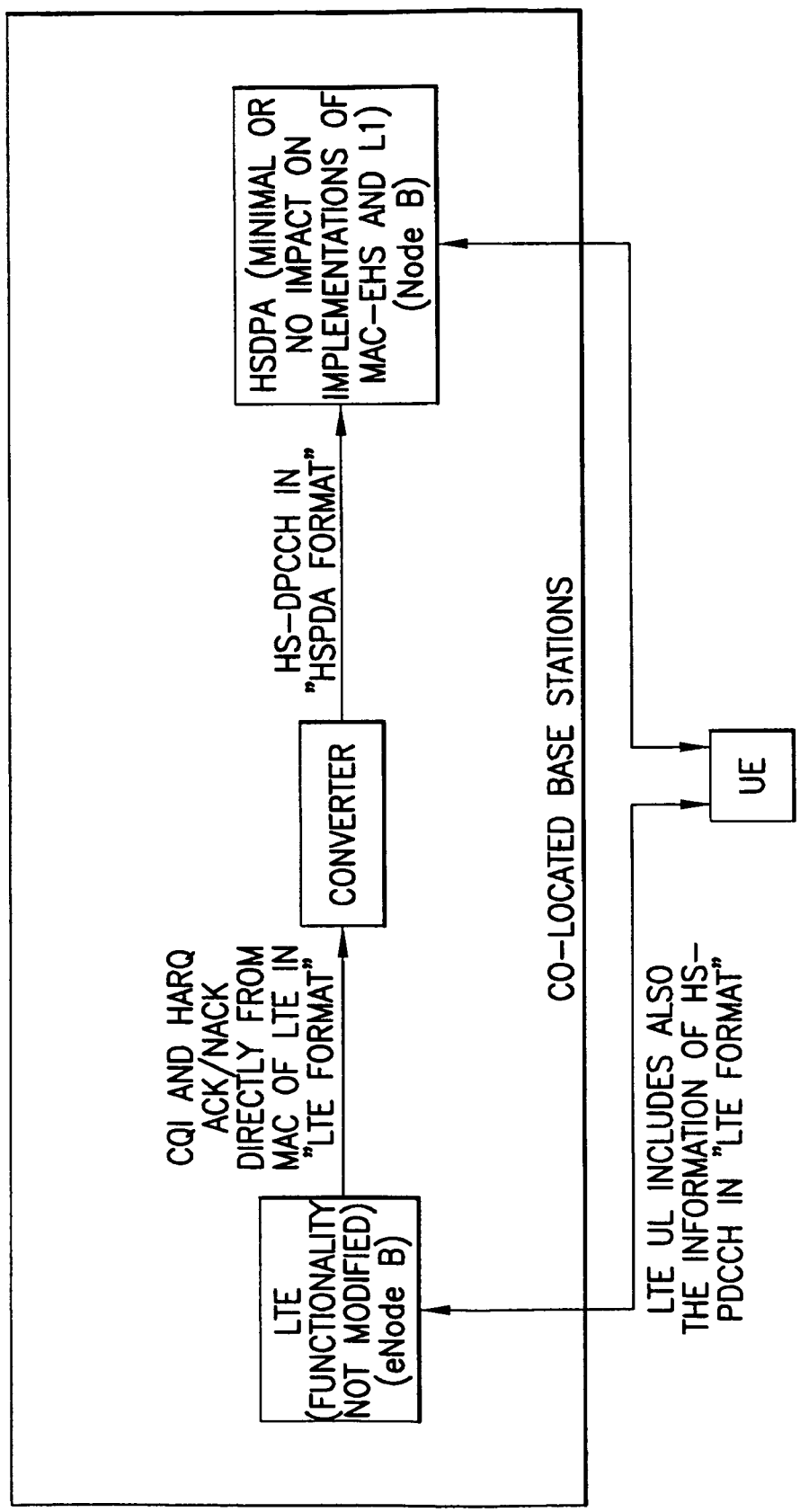
FIG. 3 is a block diagram of a logical presentation of an exemplary embodiment of the invention.

FIG. 3 presents an exemplary logical presentation of an exemplary embodiment of the invention. In this example, the converter is a logical function that would typically be performed by an eNode B (e.g., using hardware or software executing in at least one processor or some combination of these). The UE receives inter-RAT communications from the LTE eNode B and the Node B and sends feedback information to the LTE eNode B for both the LTE DL communication and the HSPA DL communication. The converter takes CQI and HARQ ACK/NACK information in a first format (e.g., an "LTE format") from, in this example, the MAC of the LTE eNode B and converts the information into a second format (e.g., an "HSPDA format") suitable for use by the HSDPA Node B).

Figure 1A:
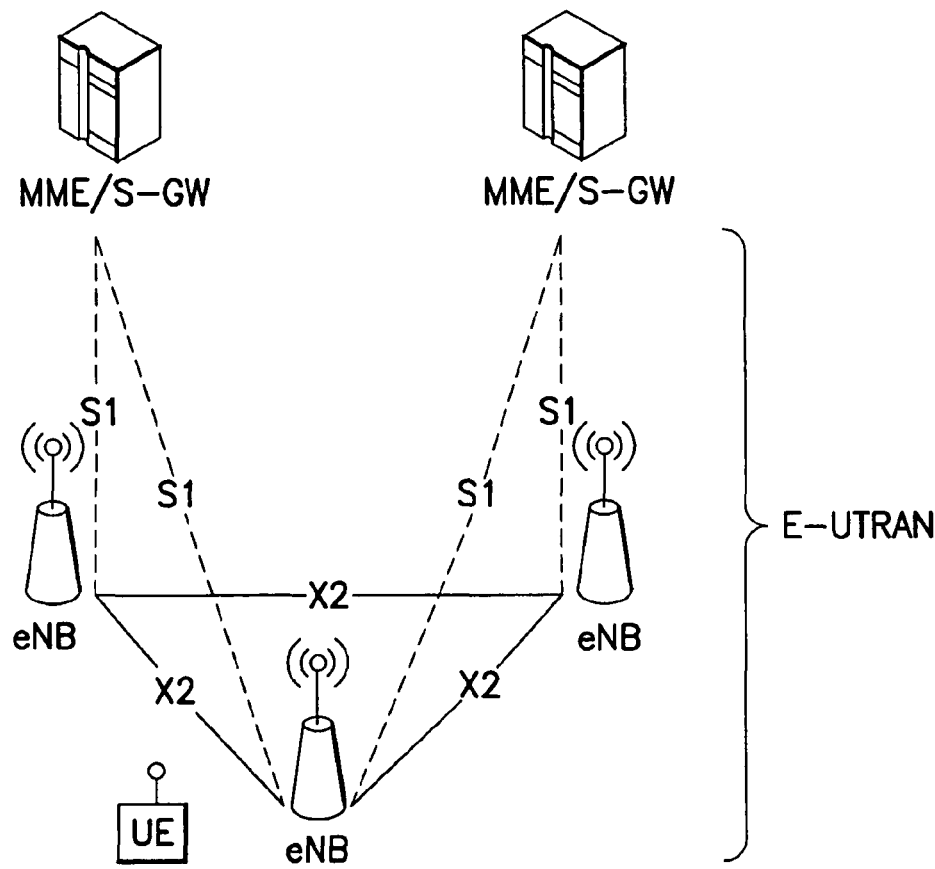
FIG. 1A reproduces FIG. 4.1 of 3GPP TS 36.300, and shows the overall architecture of the EUTRAN system.
Figure 1B:
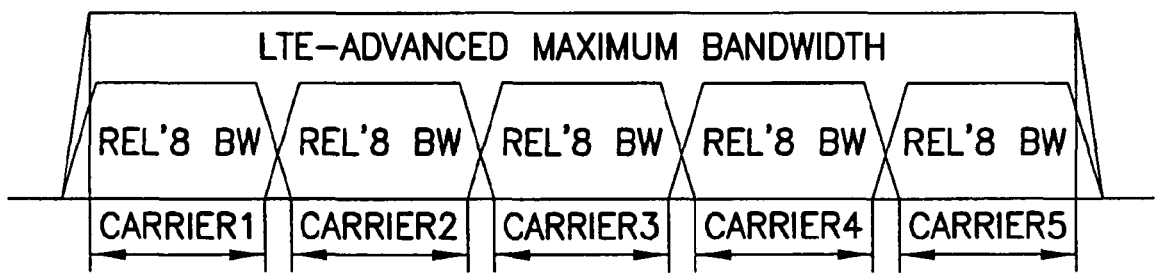
FIG. 1B shows an example of carrier aggregation for a single RAT as proposed for the LTE-A system.
Figure 4A:
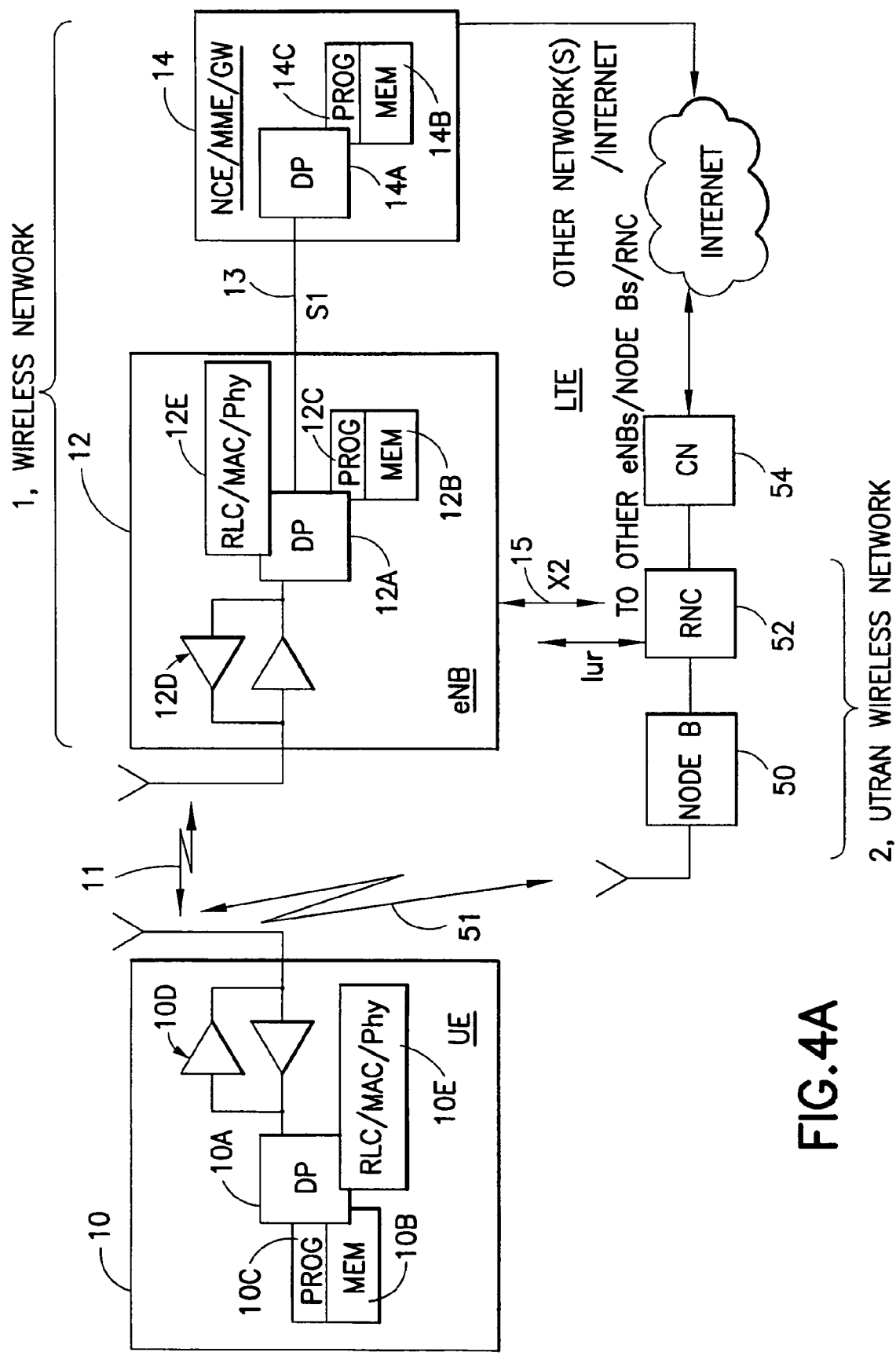
FIGS. 4A and 4B, shows a simplified block diagram of various electronic devices that are suitable for use in practicing the exemplary embodiments of this invention.
Figure 4B:
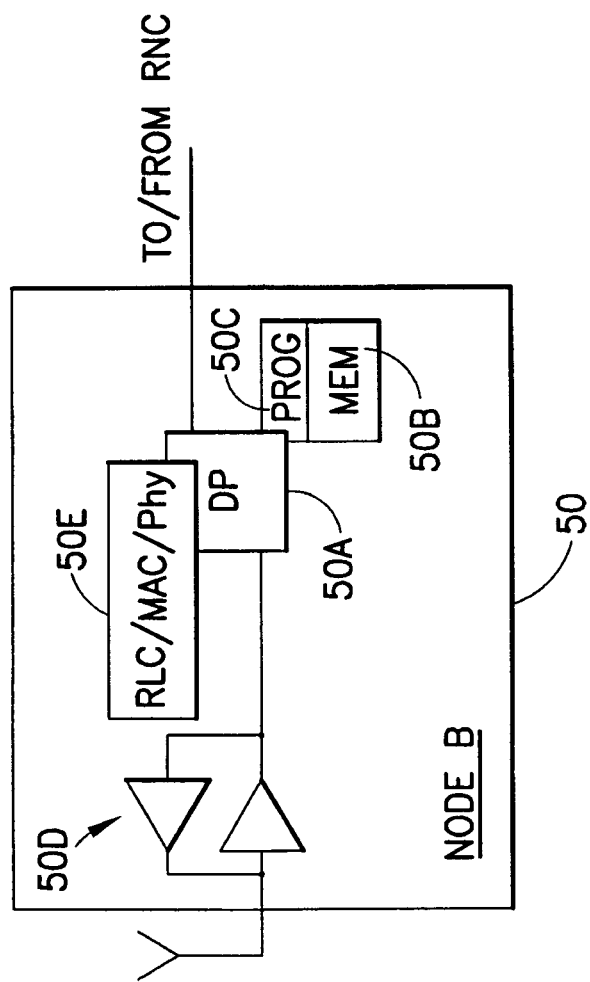

Before describing in further detail the exemplary embodiments of this invention, reference is made to FIG. 4, including FIGS. 4A and 4B, for illustrating a simplified block diagram of various electronic devices and apparatus that are suitable for use in practicing the exemplary embodiments of this invention. In FIG. 4, a wireless network 1 is adapted for communication over a wireless link 11 with an apparatus, such as a mobile communication device which may be referred to as a UE 10, via a network access node, such as an eNB 12 for the case of an LTE or LTE-A network. The network 1 may include a network control element (NCE) 14 that may include the MME/SGW functionality shown in FIG. 1A, and which provides connectivity with a further network, such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and at least one suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and at least one suitable RF transceiver 12D for communication with the UE 10 via one or more antennas. The eNB 12 is coupled via a data/control path 13 to the NCE 14. The path 13 may be implemented as the S1 interface shown in FIG. 1A. The eNB 12 may also be coupled to another eNB (or Node B) via data/control path 15, which may be implemented as the X2 interface shown in FIG. 1A.

For the purposes of describing the exemplary embodiments of this invention, the UE 10 may be assumed to also include a protocol stack (e.g., at least RLC/MAC/Phy) 10E, and the eNB 12 includes a protocol stack (e.g., at least RLC/MAC/Phy) 12E.

Also shown in FIG. 4 is a second, UTRAN wireless network 2, which is adapted for communication over a wireless link 51 with the UE 10. The wireless network 2 is, e.g., a HSPA wireless network including at least one Node B 50, at least one RNC 52 (together forming the UTRAN) and a CN 54 providing connectivity with a further network, such as a telephone network and/or a data communications network (e.g., the internet). It is assumed that the Node B 50, the RNC 52 and the elements of the CN 54 (e.g., the SGSN and GGSN) will be similarly constructed to also include data processors, memories storing computer programs and other data, and the necessary wireless transceivers and the like for communication with the UE 10.

For instance, in FIG. 4B, it is shown that the Node B 50 also includes a controller, such as a computer or a data processor (DP) 50A, a computer-readable memory medium embodied as a memory (MEM) 50B that stores a program of computer instructions (PROG) 50C, and at least one suitable RF transceiver 50D for communication with the UE 10 via one or more antennas. The Node B 50 may be assumed to also include a protocol stack (e.g., at least RLC/MAC/Phy) 50E.

It is assumed for the purposes of this invention that the UE 10 is a multi-mode (dual mode or higher) device capable of operation in different types of wireless networks. For example, there can be a plurality of transceivers 10D, where one or more operate in accordance with LTE OFDMA, and where one or more other transceivers operate in accordance with HSPA WCDMA. The program stored in memory 10B is thus assumed to be capable of operation with two or more different types of wireless networks as well, and for establishing and operating the protocol stack 10E in accordance with the particular type of wireless network standard that is in effect at any given time. The techniques herein may be considered as being implemented solely as computer program code in the UE 10, eNode B 12, and Node B 50 (e.g., as PROG 10C, 12C, or 50C, respectively), or as a combination of computer program code (executed by one or more processors) and various hardware, including memory locations, data processors, buffers, interfaces and the like, or entirely in hardware.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B, 12B, and 50B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A, and 50A may be of any type suitable to the local technical environment, and may include one or more of general purpose computers, special purpose computers, microprocessors, digital signal processors (DSPs) and processors based on a multi-core processor architecture, as non-limiting examples.

Figure 5:
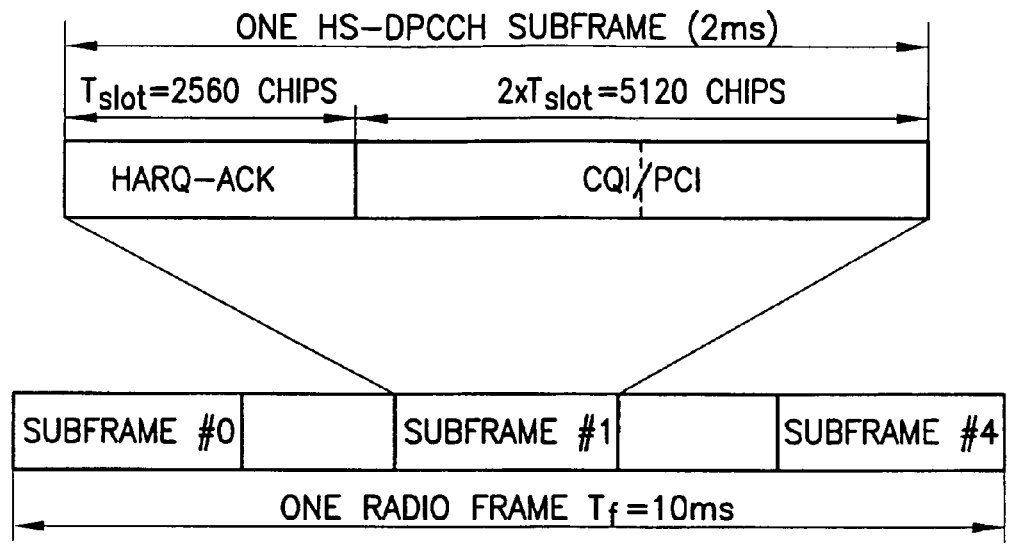
FIG. 5 is an illustration of frame structure for uplink HS-DPCCH (3GPP TS25.211 V. 9.1.0)

The HSDPA uplink feedback consists of two basic elements, a HARQ acknowledgement (HARQ-ACK) field and a channel quality indication (CQI) field. The CQI field carries also the precoding control information (PCI) bits if the HSDPA link is configured in MIMO mode (e.g., MIMO introduced from Release 7 onwards). For reference, the multiplexing of the HARQ-ACK and CQI/PCI fields in a HS-DPCCH code channel in the WCDMA/HSPA uplink is depicted in FIG. 5.

The CQI/PCI reporting is periodic. The maximum frequency in which the CQI/PCI needs to be reported is two milliseconds (ms). In case multiple HSDPA carriers are aggregated together, then the CQIs can be time multiplexed and a CQI of a particular carrier can be reported once every four milliseconds. In any case, there is likely no benefit in more frequent than once every two milliseconds CQI reporting for HSDPA.

The HARQ-ACK is transmitted in response to the reception of the downlink transmission. The HARQ-ACK transmission timing uniquely identifies the time of the DL transmission being acknowledged. The uplink feedback design should to be able to provide a HARQ-ACK feedback for each configured HSDPA data stream (e.g., dual-carrier HSDPA together with MIMO includes a total of four streams) once every two milliseconds.

As discussed above, a desirable design criterion for UL signaling of HSDPA ACK/NACK and/or CQI is to allow for independent operation of HSDPA and LTE schedulers, i.e., it should not be necessary for the LTE scheduler to dynamically provide resources for the transmission of HSDPA UL control signal.

The basic idea of some proposed signaling solutions is as follows:

A) A dedicated LTE UL PUCCH control signaling resource is semi-statically configured for each UE participating in inter-RAT CA (call this Resource (HSPA)).

1) This may be, e.g., a PUCCH format 2/2a/2b resource (a cyclic shift), or a new extended resource defined to support LTE carrier aggregation in LTE Rel-10 (using e.g. DFT-S-OFDM or Multi-Sequence modulation).

2) This may also be the same resource as configured for the UE to transmit CQI for LTE.

3) Also separate resources can be configured for ACK/NACK(s) and CQI(s).

B) When the UE needs to send the HSDPA ACK/NACK and/or CQI and there is no need to transmit any LTE signals simultaneously, the UE shall transmit the HSDPA ACK/NACK and/or CQI on the Resource (HSPA).

C) When the need to transmit simultaneously HSDPA ACK/NACK and/or CQI and LTE PUSCH occurs, the HSPA ACK/NACK and/or CQI is punctured into the PUSCH on a predefined location (set of resource elements).

1) Puncturing resolves the issues related to ambiguity of PUSCH rate matching operation by not creating any dependencies between the resource element (RE) locations of HSDPA uplink feedback and LTE signals.

D) When the need to transmit simultaneously HSDPA ACK/NACK and/or CQI and LTE PUCCH occurs, the signals are multiplexed according to predetermined rules.

1) One such rule may include omitting the transmission of LTE CQI, HSDPA CQI, or both in the case of collision according to a predetermined priority and sending only the prioritized signal.

2) Another rule, which can be combined with the previous one, is to prioritize the transmission of ACK/NACK signals over CQI. In the case of collision, CQI is dropped.

3) In the case when ACK/NACK(s) for both LTE and HSPA need to be transmitted simultaneously, the signals are transmitted separately on a single physical resource block (PRB).

a) The resource for HSPA ACK/NACK is the Resource (HSPA)).

b) The resource for LTE ACK/NACK may be determined separately based on an offset value or signaling.

Exemplary HSDPA HARQ ACK/NACK Timing

Since the TTI raster in HSPA is twice that of LTE (2 ms, and 1 ms, respectively), it makes sense to associate the HSDPA CQI and ACK/NACK into different LTE UL subframes. That is, the ACK/NACKs can be transmitted in the odd subframes and the CQIs in the even subframes, or vice versa. This removes the need to multiplex HSDPA ACK/NACK and CQI signals in the same TTI of the LTE UL, simplifying the signaling design considerably.

Figure 6:
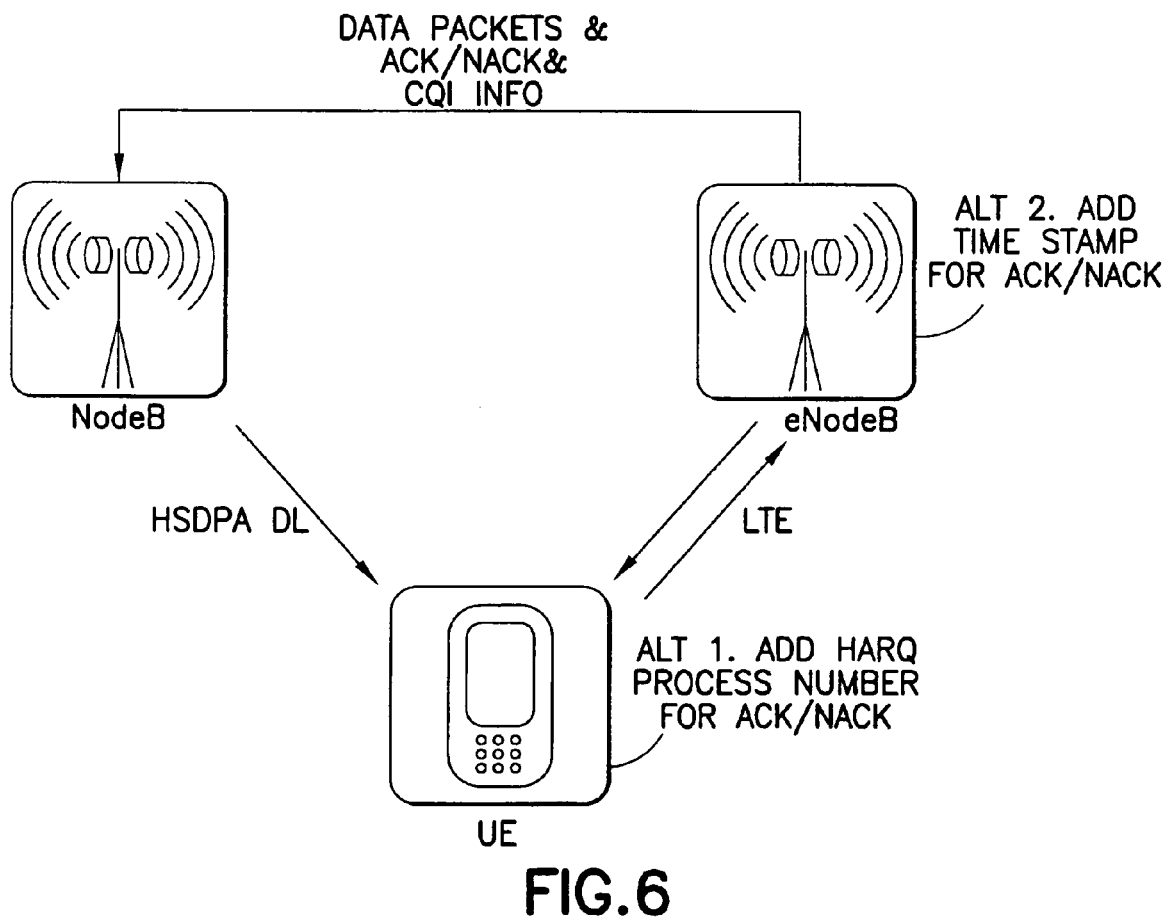
FIG. 6 is an example of how a time stamp/a HARQ process number may be embedded into the HSPA ACK/NACK signaling at the UE or at the LTE eNode B to help maintaining the proper timing of the HARQ processes.

Additional dimensions of the invention include linking the HSDPA ACK/NACK provided via the LTE uplink to a particular HSDPA HARQ process. In current HSDPA uplink signaling, the timing contains the information in that the transmission of a HARQ-ACK on HS-DPCCH starts approximately 5 ms after the end of the HSDPA TTI being acknowledged. With inter-RAT CA, the receiving entity is likely to be a different one, depending on the implementation, and it may not be possible to associate a simple ACK/NACK signal for a particular HARQ process in an error free manor. Thus, it may be beneficial also to also add in the LTE uplink the HSDPA HARQ process number (e.g., a maximum of eight) together with the ACK/NACK feedback. See FIG. 6, Alternate ("Alt") one "Alt 1". Alternatively, the receiving entity (e.g., LTE MAC of the eNode B) adds a timestamp and provides this to the HSDPA MAC layer (in Node B). See "Alt 2" in FIG. 6. The data packets communicated between the eNode B and the Node be are the data to be transmitted in DL, i.e., the RLC PDUs that are processed by the eNB and delivered further to the MAC of the eNB or MAC of the Node B for PDSCH and HSDPA transmission respectively.

LTE HARQ feedback can be carried in LTE in PUCCH or in PUSCH. In an exemplary embodiment, the PUCCH is used when there is no uplink data to be transmitted simultaneously with ACK/NACK. Thus, in an exemplary embodiment, both PUCCH and PUSCH support HSDPA HARQ feedback and CQI info.

Exemplary HSDPA ACK/NACK or CQI Transmission on PUCCH

In an exemplary implementation, dedicated PUCCH resources are configured to convey HSPA UL control signals over LTE.

A) The resource for CQI is a PUCCH 2 resource (a cyclic shift), or a larger PUCCH format defined in LTE-Advanced (e.g. multiple cyclic shifts using Multi Sequence modulation or some block spread DFT-S-OFDM resource).

B) For ACK/NACK, a PUCCH format 1/1a/1b resource will suffice for up to 2 bits; for other cases PUCCH format 2 can be used.

Figure 7:
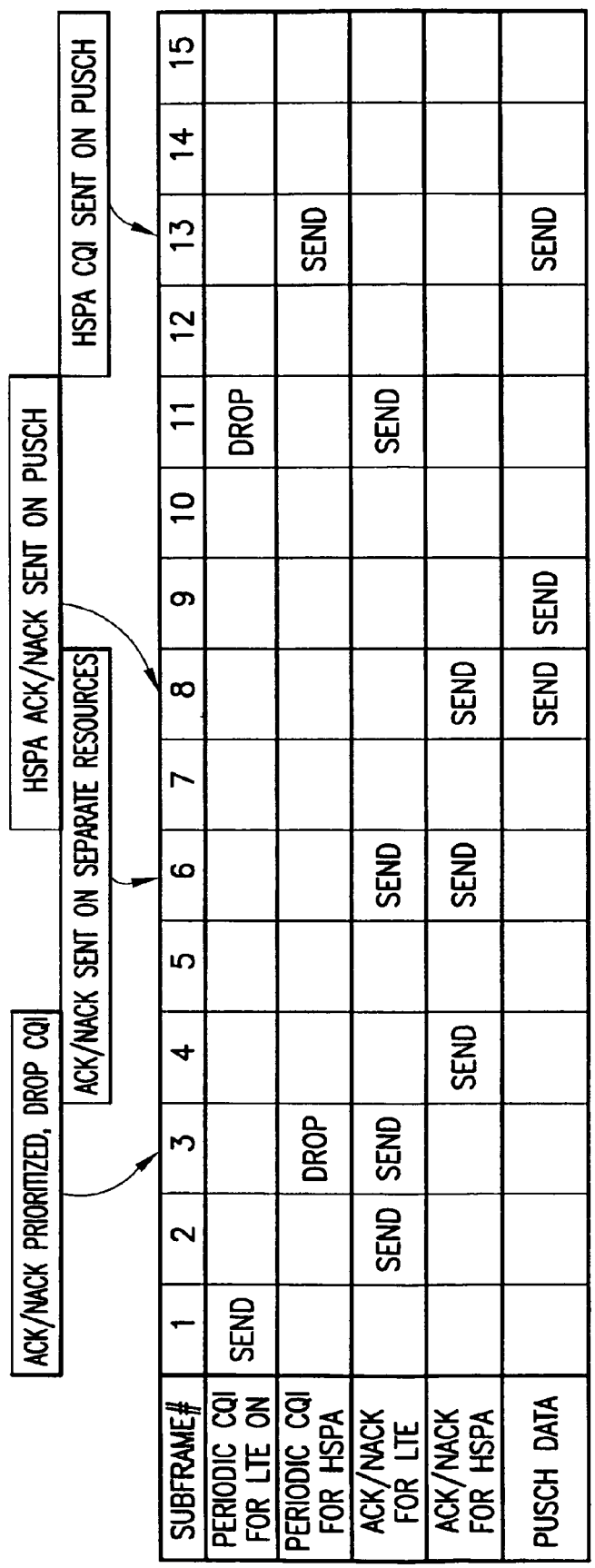
FIG. 7 illustrates an exemplary multiplexing diagram for LTE and HSPA UL control signals.

An exemplary multiplexing diagram for LTE and HSDPA UL control signals is shown in FIG. 7. In case the UE needs to send LTE PUCCH signals as well, a few alternatives exist:

A) In the case when there is a need to send ACK/NACK for one system and the CQI for the other system simultaneously, the UE could omit the transmission of CQI (i.e., prioritize ACK/NACK). See FIG. 7, where it states "ACK/NACK prioritized, drop CQI". This situation could occur because of operation at the cell edge, when it could be assumed that both carriers would not be used for sending data to ensure link budget needed for the uplink signaling.

1) Alternatively, the LTE ACK/NACK and the HSPA CQI can be multiplexed together on the resource configured for HSPA CQI. The multiplexing can be done with, e.g., joint coding, in which case the bits for LTE ACK/NACK need to be reserved always (i.e., even when LTE ACK/NACK is not sent). Otherwise, the report payload size could vary unexpectedly from one subframe to another. The alternative solution is only feasible when the UE has relatively high signal to interference plus noise ratio (SINR), i.e., not at the cell edge.

B) In the case of simultaneous CQI transmissions, one of the CQIs may be dropped. Since CQI transmission is periodic, it should be fairly easy to configure different periodicities or offsets for the CQI transmissions.

C) In the case when the need to transmit ACK/NACKs simultaneously for both systems occurs, the LTE signals are transmitted on a predetermined resource in the same PRB as the HSPA ACK/NACK. See "ACK/NACK sent on separate resources" in FIG. 7.

1) This allows for performing DTX detection of ACK/NACK signals separately while maintaining manageable Cubic Metric for the transmitted signal. DTX detection is needed for the Node B to know if the UE actually received anything. The UE transmits DTX (nothing) in the case that it did not detect the HSDPA downlink control signal.

Transmission of LTE scheduling request (SR) can be enabled as follows:

A) A scheduling request is given higher priority than HSDPA CQI. In the case of collision, the transmission of CQI is omitted and only the SR is transmitted.

1) It is also possible to configure the periodicity and the offset of SR and CQI so that the collisions will not occur.

B) Simultaneous transmission of SR and HSDPA ACK/NACK is permitted.

1) An easy solution is to configure SR and HSDPA ACK/NACK resources onto the same PRB and allow for concurrent transmission of the two signals.

FIG. 7 also shows two subframes where ACK/NACK or CQI information is sent on (e.g., punctured onto) PUSCH while data is also sent on PUSCH. This is described in more detail in reference to FIG. 10.

Figure 8:
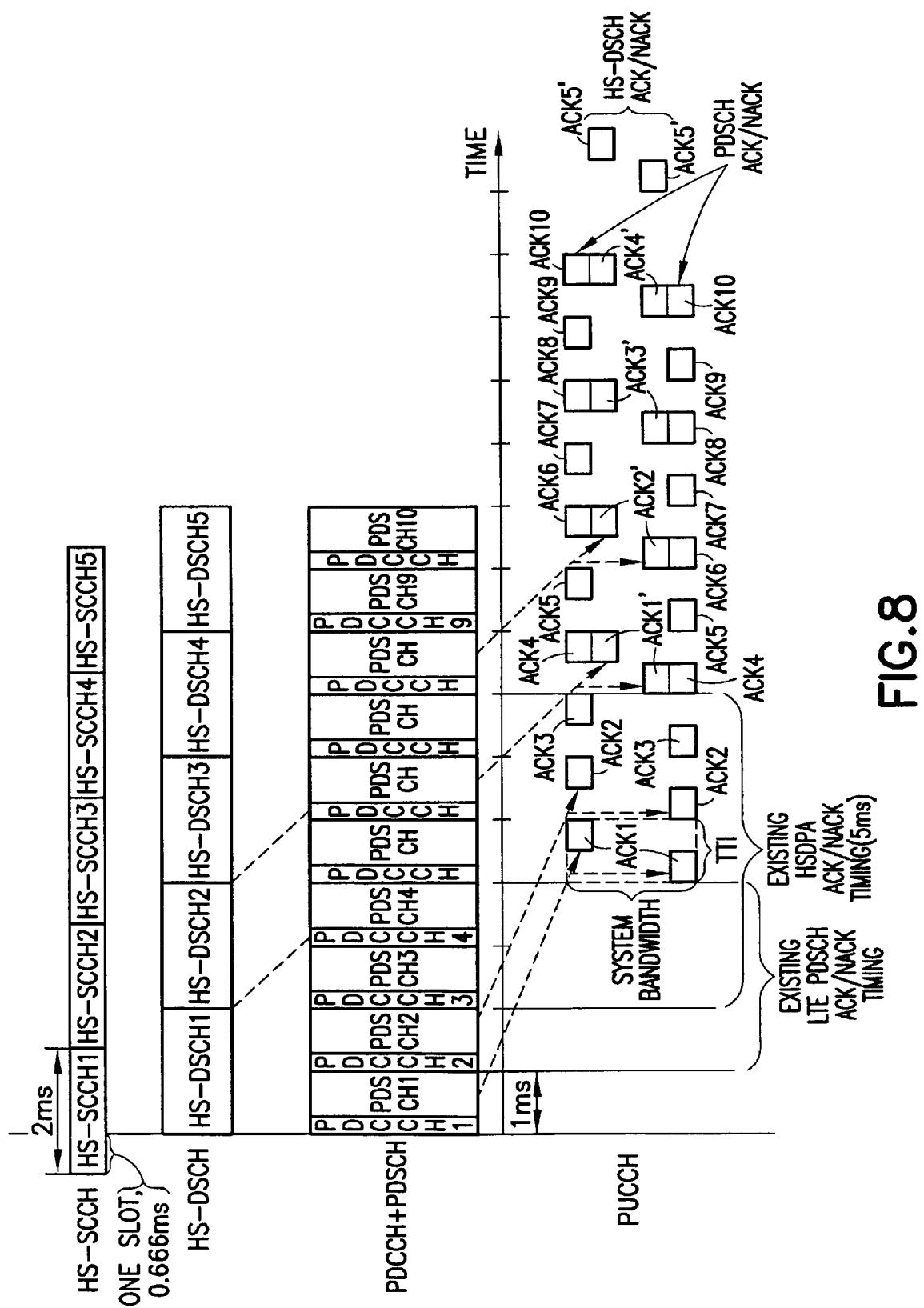
FIG. 8 is an example of basic timing of HSDPA transmission and uplink HARQ in PUCCH.
Figure 9:
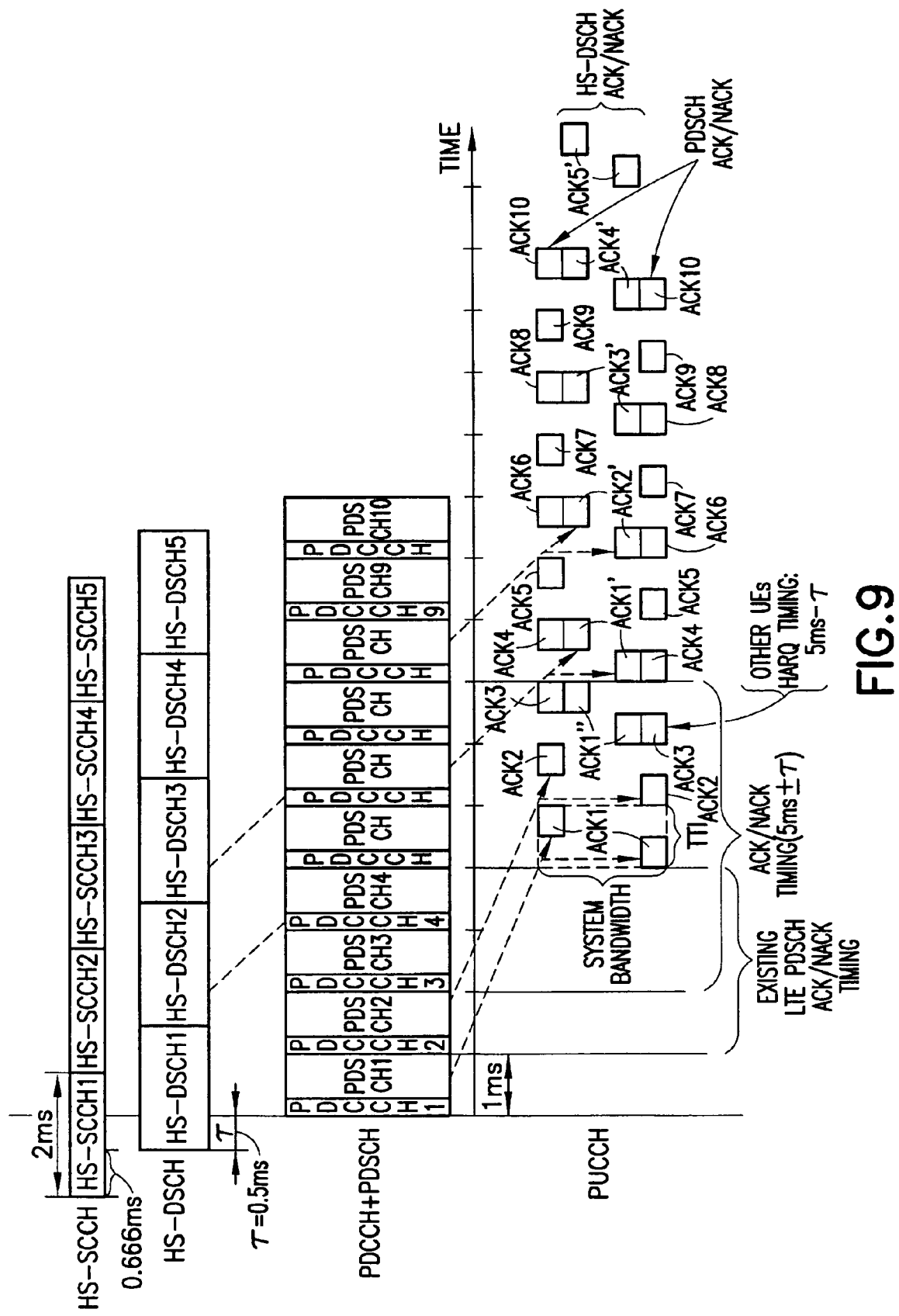
FIG. 9 is an example of basic timing of HSDPA transmission and uplink HARQ in PUCCH.

FIGS. 8 and 9 show additional embodiments where HSDPA ACK/NACK and CQI are sent using PUCCH. It is known that LTE utilizes eight process stop-and-wait (SAW) with 1 ms TTI (divided into two slots of 0.666 ms and 0.444 ms), and the number process and feedback timing are as presented in FIG. 8, which defines the UE-eNB processing times. Both have 3 (three) ms processing times, meaning that a UE has a 3 ms time to send HARQ-information (e.g., ACK/NACK) after reception of data, and the network (e.g., eNB) may perform retransmission 3 ms after reception of ACK/NACK info. The HS-DSCH starts one slot or 0.666 ms after the HS-SCCH begins.

PUCCH capacity per subframe for transmitting HARQ information depends on symbols allocated for the transmission. Rel-8 (release 8) supports already seven different formats: SR, 1 bit ACK/NACK, 2 bit ACK/NACK, CQI only, CQI with 1-2 bit ACK/NACK extended CP, CQI with 1 bit ACK/NACK, and CQI with 2 bit ACK/NACK.

As described above in reference to FIG. 5, in HSDPA, the HS-DPCCH carries HARQ-information and CQI information in a time division manner, where a first slot of 2 ms TTI contains the ACK/NACK and two later slots contain the CQI-information. Thus in order to cover HARQ information in PUCCH, a new format for PUCCH should be defined to support 1 (one) bit (ACK/NACK) per transmitted code word in HSDPA and CQI-information having currently 10 information bits.

Similarly, there could be formats for transmitting CQI information only or HARQ information only. One of these new formats could be then transmitted in parallel on existing LTE formats or could define a new format to accommodate both LTE HARQ and HSDPA HARQ information (including CQI-information). The HSDPA HARQ information and CQI information could be divided (periodic CQI information) or kept together, i.e., always transmitted together. The periodic CQI information without HARQ information could be transmitted on fixed resources allocated by radio resource control (RRC) as in case of LTE. The HARQ information could be transmitted based on a dynamic allocation principle based on downlink transmissions. Alternatively, also ACK/NACK resources could be fixed allowing simplified BTS implementation, as the eNB uplink would not need to know on which TTI the HSDPA was transmitted to a given UE. The UE would simply send NACK in case there were no transmissions.

In an exemplary embodiment, the transmission timing could utilize the timing presented in FIG. 8, which would keep the existing HARQ transmission timing in both systems. The requirement of this is that frame alignment is maintained between HSDPA and LTE (as shown in FIG. 8), and this could be achieved by the BTS transmitting both HSPA and LTE physically being the same network entity. That is, in FIG. 4, the BTS of Node B 50 and eNB 12 would be either part of the same BTS or in the same site and connected to each other (as shown in FIG. 4) to enable information exchange.

The benefit of keeping the existing timing is that the processing time inside UE and BTS is kept almost identical. In FIG. 8, the UE side timing between the end of HS-DSCH TTI and start of the ACK/NACK (approximately 7.5 HSDPA slots) is maintained. The example of FIG. 8 shows 10 locations for ACK/NACK for PDSCH (ACK 1 through ACK 10) and five locations (ACK 1' to ACK 5') for ACK/NACK for HS-DSCH.

However, as the HARQ information would be transmitted on the LTE side, the TTI of PUCCH would be 1 ms (one millisecond). As in HS-DPCCH, the ACK/NACK is received in first slot (0.666 ms) the ACK/NACK would come 0.444 ms later (in the second slot) to the BTS if the eNB needs to wait for a complete PUCCH TTI. Thus, one option is to include the HARQ-info in a first slot (seven symbols) of the PUCCH TTI and then CQI information mainly in the latter part of the TTI. However, if this timing is not seen to be critical, to obtain better frequency diversity, the HARQ information should be transmitted in both slots.

The presented timing in FIG. 8 could be further optimized by having UE specific HARQ information (ACK/NACK) offsets. This is due to fact that all UEs receiving HS-DSCH have the same frame timing. Therefore, keeping fixed ACK/NACK timing, all UE receiving LTE-HSDPA carrier aggregation with single uplink operation would have HSDPA ACK/NACK transmissions simultaneously. Thus as shown in FIG. 8, every other TTI would require PUCCH capacity for all UEs HSDPA ACK/NACK feedback. Naturally, it would be beneficial to distribute different UEs so that the capacity requirement on PUCCH would be identical for each TTI. A drawback of this optimization is that UE and network would need to support multiple different HARQ information timings.

This can be achieved by having a 1 ms offset parameter that network (e.g., the eNB 12 or Node B 50 of FIG. 4) can give to the UE so that the UE can move the HARQ information to be one TTI earlier or later to basic timing. This however would either set the requirement to the UE or the network (e.g., eNB 12 of FIG. 4) to handle the tightened timing requirement. Another option shown in FIG. 9 is to introduce a 0.5 ms timing offset between LTE and HSDPA frames, and utilize this offset as positive or negative between different UEs to divide those in different TTIs. In this example, a selected UE uses ACK/NACK (also called HARQ) timing of 5 ms+τ (see ACK 1' to ACK 5') and the other UEs use HARQ timing of 5 ms-τ (see ACK 1"), where τ is 0.5 ms. This means the PDCCH+PDCCH begins 0.5 ms after the HS-DSCH begins. In this solution, the tightened timing requirements are divided between the UE and the network. This would, however, remove the frame alignment between LTE and HSDPA downlinks. The network (e.g., the eNB 12 or the Node B 50 of FIG. 4) would communicate to each UE an appropriate timing offset (e.g., τ) or no timing offset (that is, either a communication to use a zero timing offset or no communication regarding using a timing offset) to use and each UE then adjusts the PUCCH accordingly.

An alternative way of dividing the HSDPA control load in the LTE UL carrier is to send ACK/NAK as in FIG. 8 (e.g., even subframes) and send the CQI information in remaining (e.g., odd) subframes. Then new PUCCH formats are needed to combine only HSDPA HARQ information with LTE control or HSDPA CQI information with LTE control information, i.e., there would be no need to combine HSDPA HARQ-info, CQI-info and LTE control in the same subframes.

Exemplary HSDPA ACK/NACK or CQI Transmission on PUSCH

Figure 10:
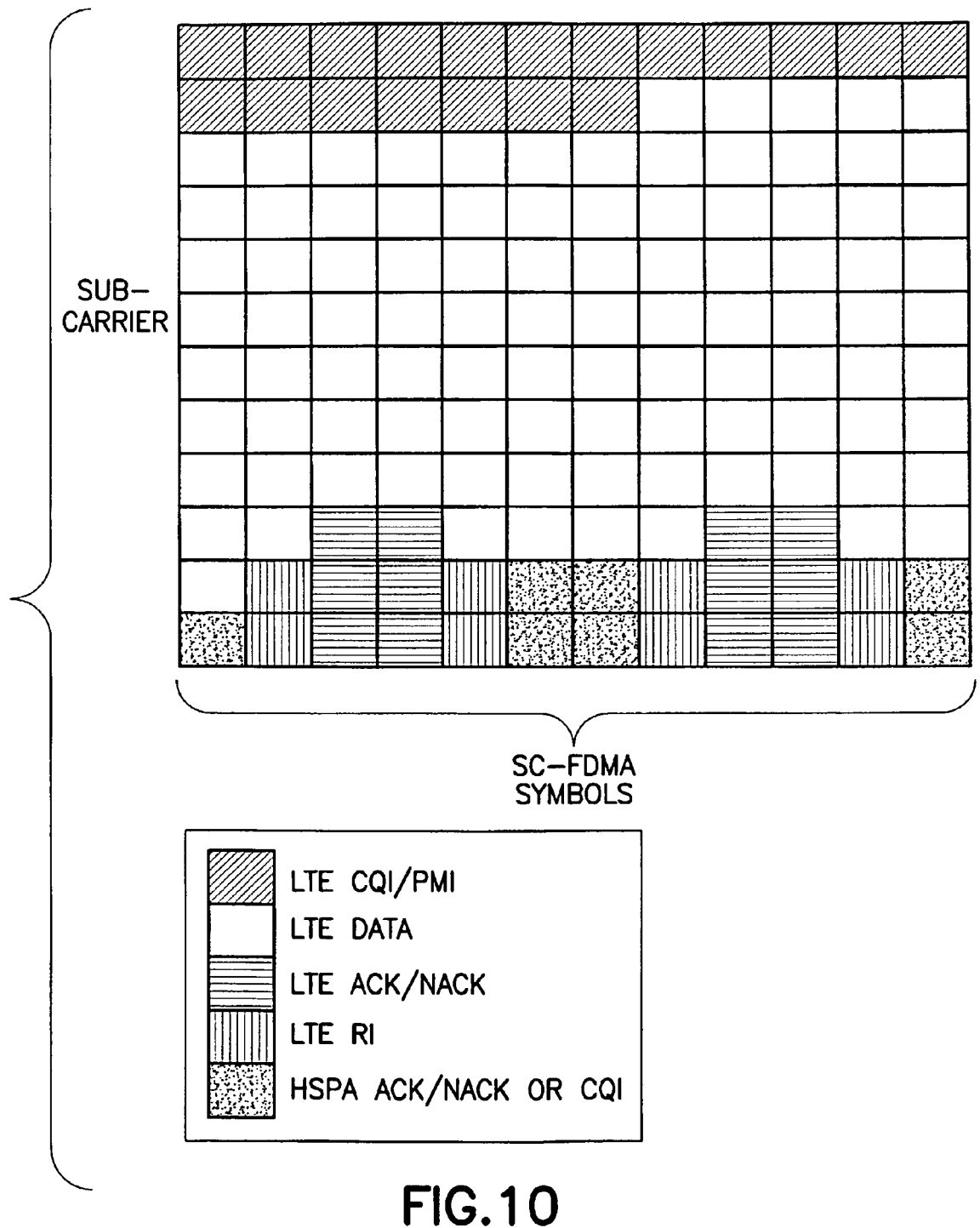
FIG. 10 is an exemplary mapping of the HSDPA UL control signals to LTE resource elements on PUSCH, where in this example the HSDPA ACK/NACK or CQI is punctured into the PUSCH data replacing any data symbols while avoiding the LTE control signal fields.
Figure 11:
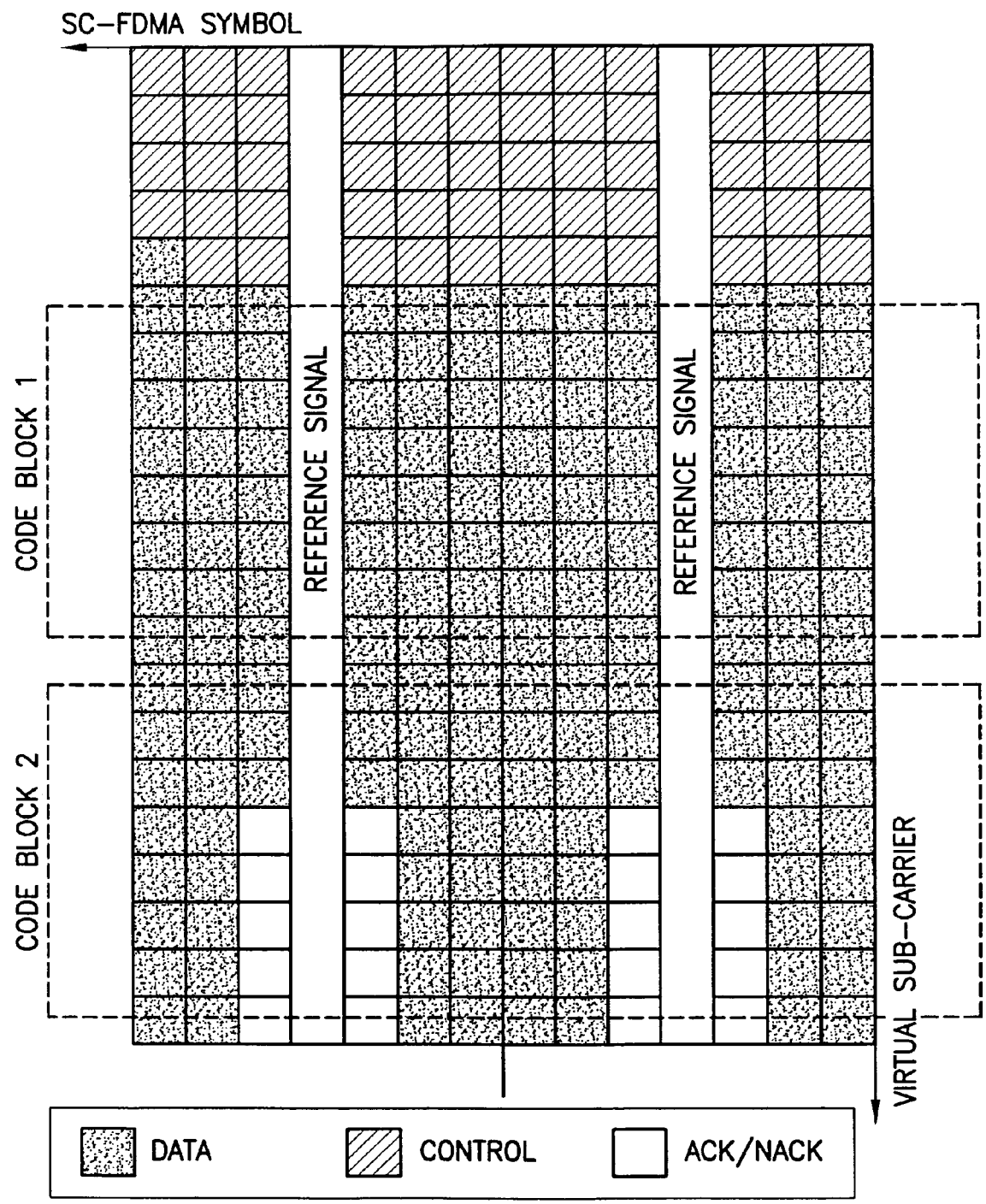
FIG. 11 is an example of LTE Rel-8 uplink PUSCH transmission with data and HARQ feedback and CQI, where RANK is not shown in figure.
Figure 12:
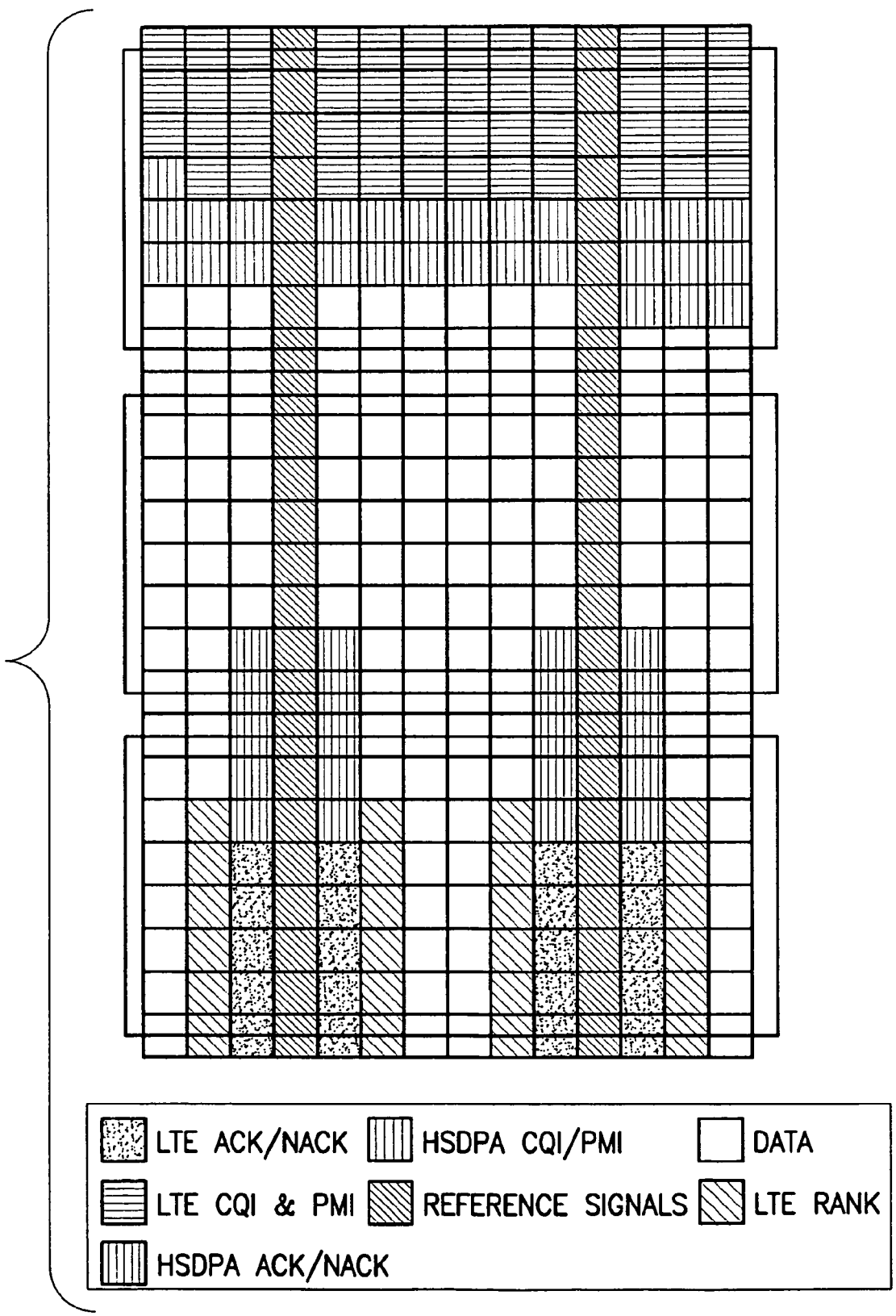
FIG. 12 is an example of symbol arrangements for LTE PUSCH when HSDPA HARQ feedback and CQI is transmitted.

In the case when HSDPA UL control signals need to be transmitted simultaneously with LTE PUSCH, there is a strong incentive to map the HSDPA uplink control to the resource elements (RE) so that the position of UL control signals does not depend on the LTE UL control signals (ACK/NACK, CQI/PMI, RI). FIG. 10 shows an example of such mapping in a resource space of LTE PUSCH. In this figure, LTE RI is LTE rank information. It is noted that the reference signals shown in FIGS. 11 and 12 are not shown in FIG. 10. The RE positions of HSDPA UL control fields (number 5) remain unchanged regardless of whether the LTE control signals are present or not. In the given example, the REs for HSDPA control signals are allocated row-wise starting from the bottom left corner. The dimensioning of the control resources can be done using the PUSCH data-control dimensioning formulas set in 3GPP TS 36.212, Section 5.2.2.6.

As there is no need to transmit HSDPA ACK/NACK and CQI signals simultaneously as discussed above, the additional UL overhead due to HSDPA signals per subframe stays on a more manageable level, e.g., relative to the simultaneous transmission discussed above.

In an exemplary embodiment, the HSDPA control signals are punctured into the data, i.e., the data is mapped first to the resource elements of the resource space shown in FIG. 10 and after that the HSDPA control signals are mapped on top, replacing the data on some of the resource elements. This allows for keeping the rate matching operation in the UE as well as the eNodeB as similar as possible compared to LTE. Furthermore, it resolves any issues related to DTX detection, when the UE misses the detection of some DL data packet.

FIGS. 11 and 12 are used to illustrate additional examples of transmitting HSDPA HARQ information and CQI in PUSCH. FIG. 11 is an example of LTE Rel-8 uplink PUSCH transmission with data and HARQ feedback and CQI, where RANK is not shown in figure. That is, FIG. 11 shows how feedback is currently communicated for PUSCH transmission. FIG. 12 presents an example of symbol arrangements for a resource space of LTE PUSCH when HSDPA HARQ feedback and CQI is transmitted.

Transmission of HARQ-info (ACK/NACK) and CQI-info (Rank & precoding) on PUSCH is basically very flexible. The UE knows (that is, determines) based on configuration and necessity of sending ACK/NACK the number of control information bits, and calculates the number of symbols needed for each control information element to given MCS based on following formula:

$$M_{ctrl} = \left\lceil \frac{N \cdot \frac{CR}{M_{Mod}}}{10^{\frac{-offset\_dB}{10}}} \right\rceil,$$

Where:
Mctrl: Number of control symbols for given control type;
N: Number of control signaling bits;
CR: coding rate of given PUSCH MCS, e.g., 3/1;
Mmod: number of (uncoded) bits/symbol, Mmod $\in \{2,4,6\}$;
offset_dB: quality difference between given control type and PUSCH data; and
S(I)NR requirement for control–S(I)NR requirement for data.

When the number of symbols is known, the symbols could be located as shown in FIG. 11. Due to above flexibility, the HS-DPCCH information (CQI information and HARQ information) could be transmitted on PUSCH together with LTE uplink control signaling. In principle, the separating uplink data and control information can be identical to Rel-8. The main issues are the separation between LTE and HSDPA control signaling. The HSDPA CQI can be located immediately next to symbols used by LTE CQI and the ACK/NACK can be located next to LTE ACK/NACK info as shown in FIG. 12. FIG. 12 presents possible arrangement of HSDPA CQI information, HARQ information mapping to the LTE frames and symbols.

The HARQ timing between downlink HSDPA transmission and corresponding ACK/NACK information is similar to PUCCH timing presented in FIGS. 8 and 9.

If no DL HS-DSCH transmission is detected, the ACK/NACK resources could be discontinuous transmission (DTX), or used for data. With fixed resources and DTX, the eNB would not need to know if HSDPA transmission occurred or not, as the eNB would decode fixed resources always as ACK/NACK. This would be less optimum compared to using those symbols fully for data, but would require that the eNB uplink receiver (e.g., as part of transceiver 12D) would know if the corresponding HS-DSCH transmission took place or not.

Separation of HSDPA CQI-info and ACK/NACK in different places could be arranged similar manner as in LTE. In those TTI when there is no CQI-info transmission for HSDPA, the symbols would be utilized for data.

In the same way as for PUCCH, HSDPA HARQ-info (ACK/NAK) and CQI-info can be divided into separate subframes, thus having either HARQ-info only or CQI-info only in one subframe.

Figure 13:
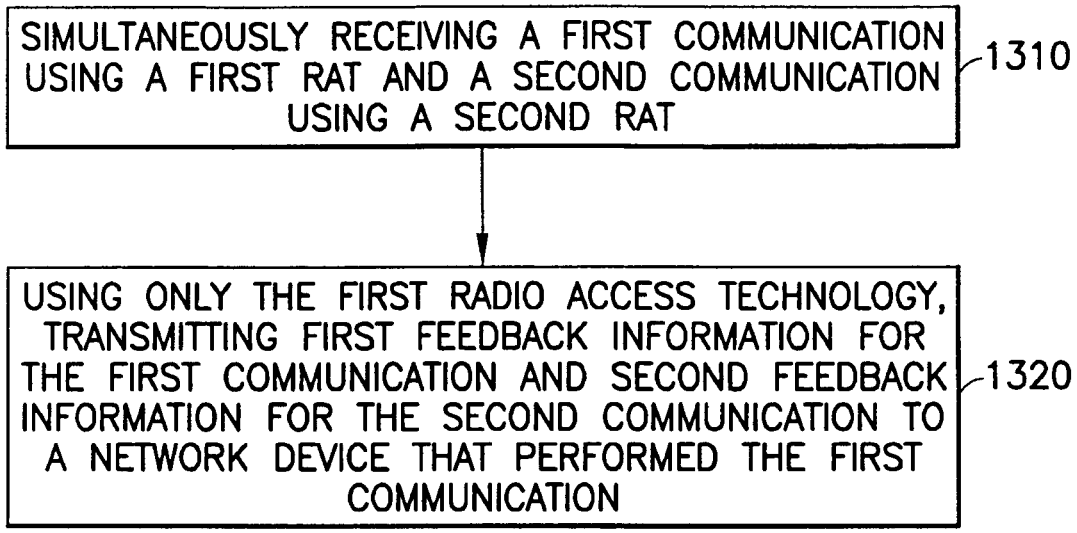
FIG. 13 is a block diagram of a flowchart of actions taken by a user equipment for feedback for inter-RAT carrier aggregation.

Turning now to FIG. 13 a block diagram is shown of a flowchart of actions taken by a user equipment for feedback for inter-RAT carrier aggregation. In block 1310, a user equipment simultaneously receives a first communication using a first radio access technology and a second communication using a second radio access technology. In block 1320, a user equipment, using only the first radio access technology, transmits first feedback information for the first communication and second feedback information for the second communication to a network device that performed the first communication.

Figure 14:
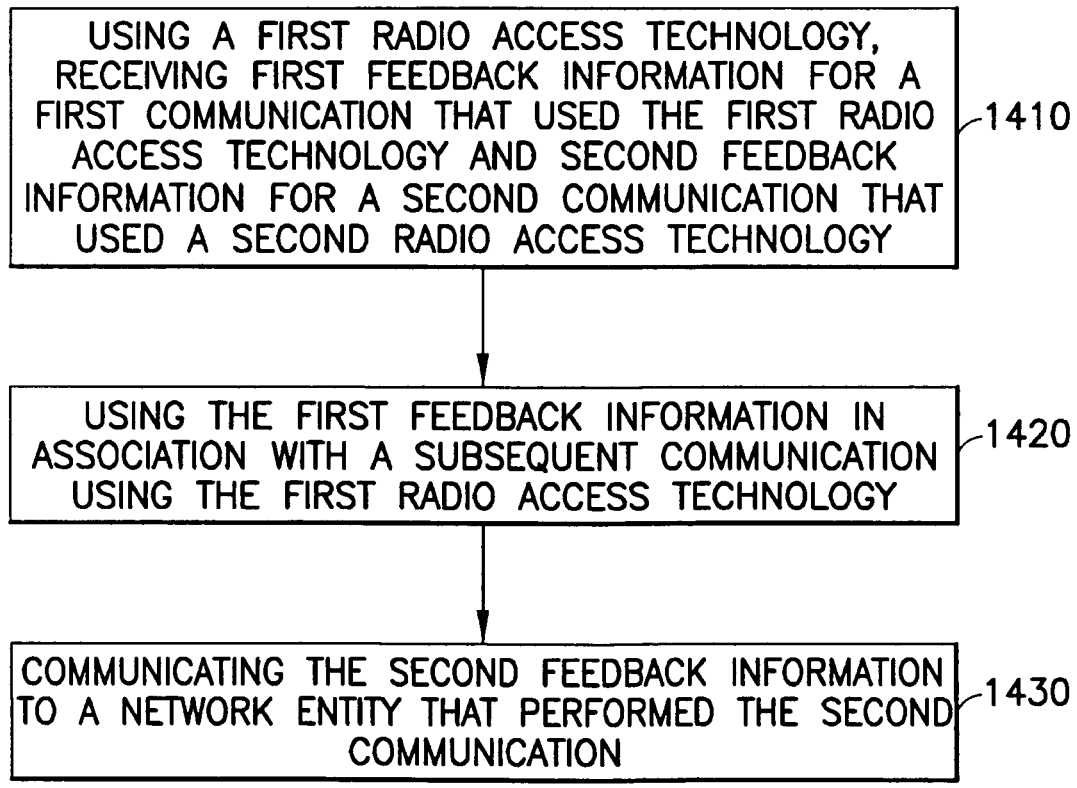
FIG. 14 is a block diagram of a flowchart of actions taken by a network entity for feedback for inter-RAT carrier aggregation.

Referring to FIG. 14, a block diagram is shown of a flowchart of actions taken by a network entity (e.g., eNB 12 of FIG. 4) for feedback for inter-RAT carrier aggregation. In block 1410, the network entity, using a first radio access technology, receives first feedback information for a first communication that used the first radio access technology and second feedback information for a second communication that used a second radio access technology. In block 1420, the network entity uses the first feedback information in association with a subsequent communication using the first radio access technology. For instance, the CQI/PMI information could be used for subsequent communications as is known in the art, or the ACK/NACK information could be used to resend information. In block 1430, the network entity communicates the second feedback information to another network entity (e.g., the Node B 50 of FIG. 4) that performed the second communication.

The invention, in some embodiments, may have at least the following advantages:

A) Solutions for how to signal HSPA ACK/NACK and CQI over LTE UL are provided.

B) The proposed signaling schemes allow for simple implementation of the inter-RAT aggregation by avoiding the need for the HSPA and LTE schedulers to communicate with each other dynamically, i.e., on a millisecond time scale.

C) The LTE scheduler implementation is kept unchanged compared to the case without Inter-RAT CA.

D) The presented signaling schemes minimize the need for blind decoding of data in the eNodeB.

E) On PUSCH, the rate matching operation is kept unchanged by puncturing the HSDPA UL Control signals into the PUSCH data region. This allows for keeping a large part of the eNodeB baseband functionality the same as in regular LTE eNodeBs F) The suggested timing relationship between HSDPA ACK/NACK and CQI on LTE UL simplifies feedback signaling considerably by avoiding the need for code/frequency multiplexing of the two signals.

G) Embedding a time stamp/HARQ process indicator to the HSDPA ACK/NACK resolves the timing ambiguity issue with non-deterministic processing delays between eNodeB and NodeB MAC layers.

Without in any way limiting the scope, interpretation, or application of the claims appearing below, a technical effect of one or more of the example embodiments disclosed herein is to use the UL of a selected RAT for feedback information for DL communications involving the selected RAT and another RAT.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with examples of computers described and depicted, e.g., in FIG. 4. A computer-readable medium may comprise a computer-readable storage medium that may be any media or means that can contain or store the instructions for use by or in connection with an instruction execution system, apparatus, or device, such as a computer.

It is also noted that any of the embodiments herein (including in the claims) may be implemented in an apparatus/device that includes means for performing certain functions. For example, an apparatus could include means for simultaneously receiving a first communication using a first radio access technology and a second communication using a second radio access technology; and means, using only the first radio access technology, for transmitting first feedback information for the first communication and second feedback information for the second communication to a network device that performed the first communication.

As another example, an apparatus could include means, using a first radio access technology, for receiving first feedback information for a first communication that used the first radio access technology and second feedback information for a second communication that used a second radio access technology; means for using the first feedback information in association with a subsequent communication using the first radio access technology; and means for communicating the second feedback information to a network entity that performed the second communication.

In other exemplary embodiments, a computer program comprises code for simultaneously receiving a first communication using a first radio access technology and a second communication using a second radio access technology, and code for using only the first radio access technology, transmitting first feedback information for the first communication and second feedback information for the second communication to a network device that performed the first communication, when the computer program is run on a processor.

Another exemplary embodiment includes the computer program according to the preceding paragraph, wherein the computer program is a computer program product comprising a computer-readable medium bearing computer program code embodied therein for use with a computer.

In additional exemplary embodiments, a computer program comprises code for, using a first radio access technology, receiving first feedback information for a first communication that used the first radio access technology and second feedback information for a second communication that used a second radio access technology, code for using the first feedback information in association with a subsequent communication using the first radio access technology, and code for communicating the second feedback information to a network entity that performed the second communication, when the computer program is run on a processor.

Another exemplary embodiment includes the computer program according to the preceding paragraph, wherein the computer program is a computer program product comprising a computer-readable medium bearing computer program code embodied therein for use with a computer.

In a further exemplary embodiment, a computer program product comprising a computer-readable medium bearing computer program code embodied therein for use with a computer is disclosed. The computer program code comprises: simultaneously receiving a first communication using the first radio access technology and a second communication using the second radio access technology; and code for using only the first radio access technology, transmitting first feedback information for the first communication and second feedback information for the second communication to a network device that performed the first communication.

In yet a further exemplary embodiment, a computer program product comprising a computer-readable medium bearing computer program code embodied therein for use with a computer is disclosed. The computer program code comprises: using a first radio access technology, receiving first feedback information for a first communication that used the first radio access technology and second feedback information for a second communication that used a second radio access technology; code for using the first feedback information in association with a subsequent communication using the first radio access technology; and code for communicating the second feedback information to a network entity that performed the second communication.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims

What is claimed is:

1. A method, comprising:
    simultaneously receiving a first communication using a first radio access technology and a second communication using a second radio access technology, wherein the first radio access technology and the second radio access technology are different; and
    using only the first radio access technology, transmitting first feedback information for the first communication and second feedback information for the second communication to a network device that performed the first communication.

2. The method of claim 1, wherein the first radio access technology uses orthogonal frequency division multiple access for the first communication and single carrier, frequency division multiple access for the transmitting of the first and second feedback information, and wherein the second radio access technology uses wideband code division multiple access for the second communication.

3. The method of claim 1, wherein the first feedback information comprises one or both of hybrid automatic repeat request information or channel quality indicator information, and wherein the second feedback information comprises one or both of hybrid automatic repeat request information or channel quality indicator information.

4. The method of claim 3, wherein the second feedback information comprises both the hybrid automatic repeat request information and the channel quality indicator information, wherein transmitting using only the first radio access technology uses a plurality of subframes, each subframe comprising first and second slots, and wherein the hybrid automatic repeat request information for the second communication is transmitted on the first slot and the channel quality indicator information for the second communication is transmitted on the second slot for selected subframes of the plurality of subframes.

5. The method of claim 4, wherein the transmitting uses a physical uplink control channel.

6. The method of claim 3, wherein the first feedback information comprises the hybrid automatic repeat request information and the second feedback information comprises the channel quality indicator information, and wherein the channel quality indicator information for the second communication is not transmitted during a time period when both the hybrid automatic repeat request information for the first communication and the channel quality indicator for the second communication are to be transmitted.

7. The method of claim 3, wherein the second feedback information comprises hybrid automatic repeat request information, wherein the method further comprises determining a hybrid automatic repeat request process number corresponding to the hybrid automatic repeat request information for the second information, and transmitting further comprises transmitting the hybrid automatic repeat request process number along with the second feedback information.

8. The method of claim 3, wherein the second feedback information comprises hybrid automatic repeat request information, wherein transmitting using only the first radio access technology uses a plurality of subframes, each subframe comprising first and second slots, and wherein the hybrid automatic repeat request information for the second feedback information is transmitted on both the first and second slots for selected ones of the plurality of subframes.

9. The method of claim 3, wherein:
    the first feedback information comprises both the hybrid automatic repeat request information and the channel quality indicator information;
    the second feedback information comprises both the hybrid automatic repeat request information and the channel quality indicator information; and
    transmitting further comprises transmitting the first and second feedback information on resource elements of a resource space.

10. The method of claim 9, wherein the second feedback information is adjacent to rank information in the resource space.

11. The method of claim 9, wherein the resource elements used for the channel quality indicator information for the second feedback information are adjacent to resource elements used for channel quality indicator information for the first feedback information and adjacent to resource elements used for data, and wherein resource elements used for the hybrid automatic repeat request information for the second feedback information are adjacent to resource elements used for reference signals.

12. The method of claim 9, wherein the transmitting uses a physical uplink shared channel.

13. The method of claim 1, wherein transmitting further comprises adjusting a predetermined timing of transmitting the first and second feedback information by a timing offset.

14. An apparatus, comprising:
    at least one transceiver configured to transmit and receive using a first radio access technology and configured to transmit and receive using a second radio access technology;
    at least one processor; and
    at least one memory including computer program code,
    the at least one memory and the computer program code configured to, with the at least one processor, cause the apparatus to perform at least the following:
    simultaneously receiving a first communication using the first radio access technology and a second communication using the second radio access technology, wherein the first radio access technology and the second radio access technology are different; and using only the first radio access technology, transmitting first feedback information for the first communication and second feedback information for the second communication to a network device that performed the first communication.

15. The apparatus of claim 14, wherein the first radio access technology uses orthogonal frequency division multiple access for the first communication and single carrier, frequency division multiple access for the transmitting of the first and second feedback information, and wherein the second radio access technology uses wideband code division multiple access for the second communication.

16. The apparatus of claim 14, wherein the first feedback information comprises one or both of hybrid automatic repeat request information or channel quality indicator information, and wherein the second feedback information comprises one or both of hybrid automatic repeat request information or channel quality indicator information.

17. A method, comprising:
using a first radio access technology, receiving first feedback information for a first communication that used the first radio access technology and second feedback information for a second communication that used a second radio access technology, wherein the first radio access technology and the second radio access technology are different;
using the first feedback information in association with a subsequent communication using the first radio access technology; and
communicating the second feedback information to a network entity that performed the second communication.

18. The method of claim 17, wherein the first radio access technology uses orthogonal frequency division multiple access for the first communication and single carrier, frequency division multiple access for the receiving of the first and second feedback information, and wherein the second radio access technology uses wideband code division multiple access for the second communication.

19. The method of claim 17, wherein the first feedback information comprises one or both of hybrid automatic repeat request information or channel quality indicator information, and wherein the second feedback information comprises one or both of hybrid automatic repeat request information or channel quality indicator information.

20. The method of claim 17, wherein communicating the second feedback information further comprises adding a timestamp to the first feedback information, the timestamp indicating arrival of the first feedback information, and communicating the timestamp and the first feedback information to the network entity that performed the second communication.

21. The method of claim 17, wherein the first radio access technology comprises a plurality of first subframes used for the first communication and a plurality of second subframes used for the second communication, wherein the first subframes begin at a first time and the second subframes begin at a second time, wherein the first time begins a timing offset after the second time, and wherein receiving further comprises receiving the first and second feedback information in subframes that are the timing offset moved from a predetermined starting time.

* * * * *